US011169798B1

United States Patent
Palmer et al.

(10) Patent No.: US 11,169,798 B1
(45) Date of Patent: Nov. 9, 2021

(54) AUTOMATED CREATION, TESTING, TRAINING, ADAPTATION AND DEPLOYMENT OF NEW ARTIFICIAL INTELLIGENCE (AI) MODELS

(71) Applicant: Dialpad, Inc., San Francisco, CA (US)

(72) Inventors: James Palmer, Novato, CA (US); Kevin James, San Francisco, CA (US); Jonathan Johnston, San Francisco, CA (US)

(73) Assignee: DIALPAD, INC., San Ramon, CA (US)

( * ) Notice: Subject to any disclaimer, the term of this patent is extended or adjusted under 35 U.S.C. 154(b) by 0 days.

(21) Appl. No.: 16/921,849

(22) Filed: Jul. 6, 2020

Related U.S. Application Data (60) Provisional application No. 62/871,021, filed on Jul. 5, 2019.

(51) Int. Cl.
*G06F 8/76* (2018.01)
*G06F 8/71* (2018.01)
*G06F 16/901* (2019.01)
*G06F 16/957* (2019.01)
*H04L 12/24* (2006.01)
*G06F 8/30* (2018.01)
*G06F 16/951* (2019.01)

(52) U.S. Cl.
CPC ............... *G06F 8/71* (2013.01); *G06F 8/76* (2013.01); *G06F 16/9024* (2019.01); *G06F 16/9574* (2019.01); *H04L 41/16* (2013.01); *G06F 8/311* (2013.01); *G06F 16/951* (2019.01)

(58) Field of Classification Search
CPC ... G06F 8/71; G06F 8/76; G06F 8/311; G06F 16/9574; G06F 16/9024; G06F 16/951; H04L 41/16
See application file for complete search history.

(56) References Cited

U.S. PATENT DOCUMENTS

| 10,262,102 | B2 * | 4/2019 | Brown ................... G16B 45/00 |
| 2018/0293498 | A1 * | 10/2018 | Campos ................ G06F 16/951 |
| 2018/0357552 | A1 * | 12/2018 | Campos ................ G06N 5/043 |
| 2020/0250747 | A1 * | 8/2020 | Padmanabhan .......... G06N 5/04 |
| 2020/0252205 | A1 * | 8/2020 | Padmanabhan ...... G06K 9/6256 |

(Continued)

OTHER PUBLICATIONS

Poonem Kristhombuge et al., Performance Analysis: A Case study on Network Management System using Machine Learning, Jun. 2018, [Retrieved on Jun. 2, 2021], Retrieved from the internet: <URL: https://trepo.tuni.fi/bitstream/handle/10024/104011/1531131671. pdf?sequence=1> 103 Pages (1-103) (Year: 2018).*

(Continued)

*Primary Examiner* — Anibal Rivera
(74) *Attorney, Agent, or Firm* — Patent Law Works LLP (57) ABSTRACT

Functionality is provided for the automated creation, testing, training, adaptation and deployment of AI models and changes thereto. Base classes are provided that enable practicable creation of new models from existing one. New models are tested on live data sets offline from user sites. New training methods are provided for the production of particular outcomes. Efficient adaptation of new AI models is facilitated, encompassing data scientist and development team control over how fast to train and deploy new models.

7 Claims, 10 Drawing Sheets

(56) References Cited

U.S. PATENT DOCUMENTS

2020/0285464 A1\* 9/2020 Brebner .................. G06F 8/311
2020/0285788 A1\* 9/2020 Brebner .................. G06F 9/547

OTHER PUBLICATIONS

David A. Bader et al., Parallel Algorithm Design for Branch and Bound, 2005, [Retrieved on Jun. 2, 2021], Retrieved from the internet: <URL: https://davidbader.net/publication/2005-bhp/2005-bhp.pdf> 47 Pages (1-47) (Year: 2005).\*

\* cited by examiner

AUTOMATED CREATION, TESTING, TRAINING, ADAPTATION AND DEPLOYMENT OF NEW ARTIFICIAL INTELLIGENCE (AI) MODELS

PRIORITY CLAIM AND CROSS REFERENCE TO RELATED APPLICATION

The present application claims the benefit under 35 U.S.C. § 119(e) of U.S. Provisional Patent Application Ser. No. 62/871,021, entitled "Model Server Architecture," filed on Jul. 5, 2019, and having the same inventors and assignee, the entire contents of which are incorporated herein by reference.

TECHNICAL FIELD

This disclosure pertains generally to an architecture for the automated creation, testing, training, adaptation and deployment of new artificial intelligence (AI) models.

SUMMARY

Functionality is provided for the automated creation, testing, training, adaptation and deployment of AI models and changes thereto. Base classes are provided that enable practicable creation of new models from existing one. New models are tested on live data sets offline from user sites. New training methods are provided for the production of particular outcomes. Efficient adaptation of new AI models is facilitated, encompassing data scientist and development team control over how fast to train and deploy new models.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various example implementations for purposes of illustration only. One skilled in the art will readily recognize from the following discussion that alternative examples of the structures and methods illustrated herein may be employed without departing from the principles described herein.

DETAILED DESCRIPTION

Figure 1:
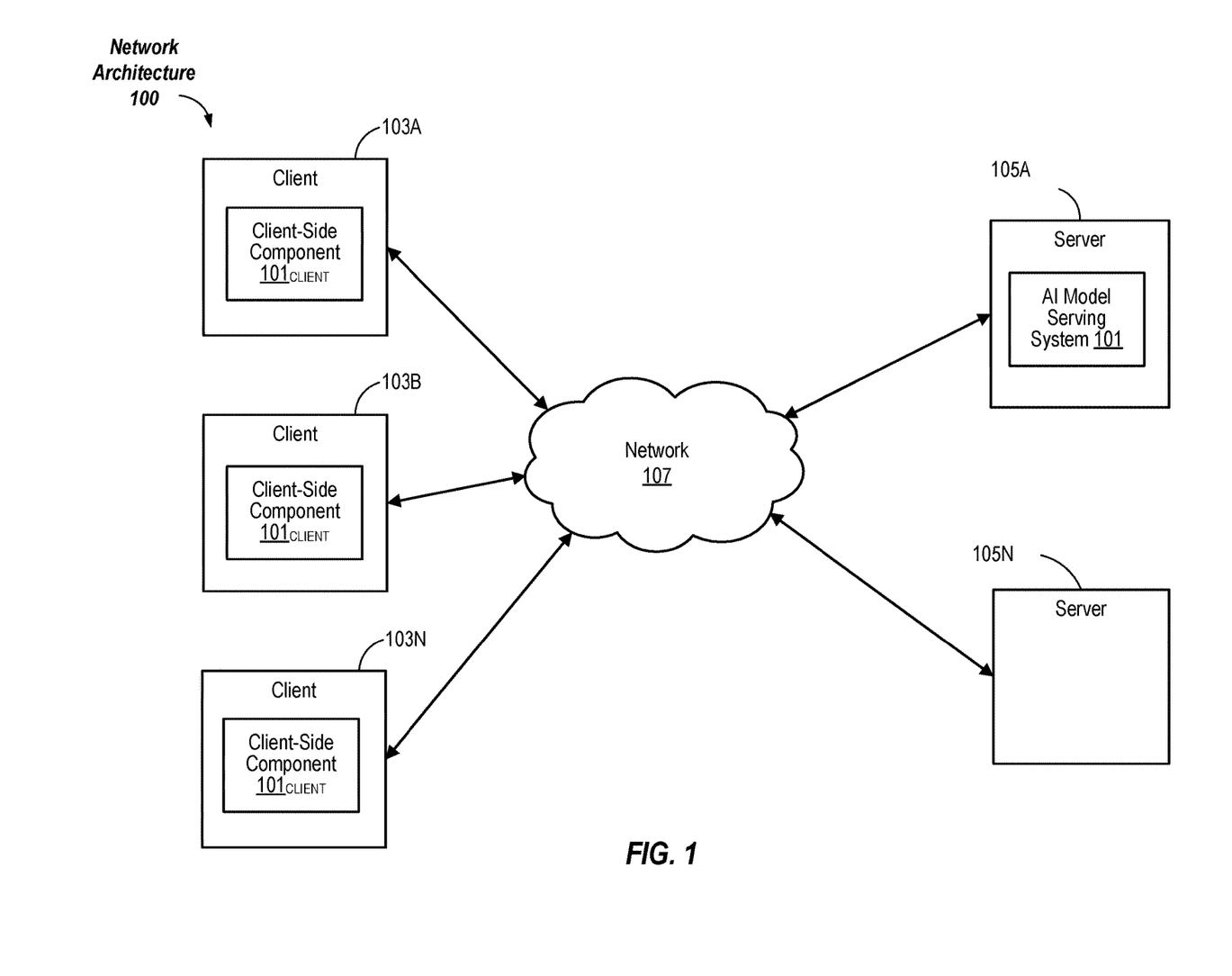
FIG. 1 is a block diagram of an exemplary network architecture in which an artificial intelligence (AI) model serving system can be implemented.

FIG. 1 is a block diagram illustrating an exemplary network architecture 100 in which an AI model serving system 101 can be implemented. In the illustrated network architecture 100, client systems 103A, 103B, 103C and 103N, as well as servers 105A and 105N, are communicatively coupled to a network 107. It is to be understood that in practice more (or fewer) clients 103 and/or servers 105 can be deployed. An AI model serving system 101 is illustrated as residing on server 105A, with client-side components $101_{CLIENT}$ residing on each client, 103A, 103B, and 103N. It is to be understood that in different implementations the AI model serving system 101 can reside on different computers 210, or be distributed between multiple computing systems 210 in different ways as desired.

Many different networking technologies can be used to provide connectivity from each of client computing devices 103A-N and servers 105A-N to network 107. Some examples include: WAN, LAN, and various wireless technologies (e.g., WiFi, LTE, etc.). Client systems 103A-N are able to access applications and/or data on server 105A or 105N using, for example, a web browser or other client software (not shown). Clients 103 can be in the form of, for example, desktop computers, laptop computers, smartphones or other mobile computing devices, comprising portable computing devices capable of connecting to a network 107 and running applications. Servers 105 can be in the form of, for example, track mounted or tower computers. In one implementation, the network 107 is in the form of the internet. Other networks 107 or network-based environments can be used in addition to or instead of the internet in other implementations.

Figure 2:
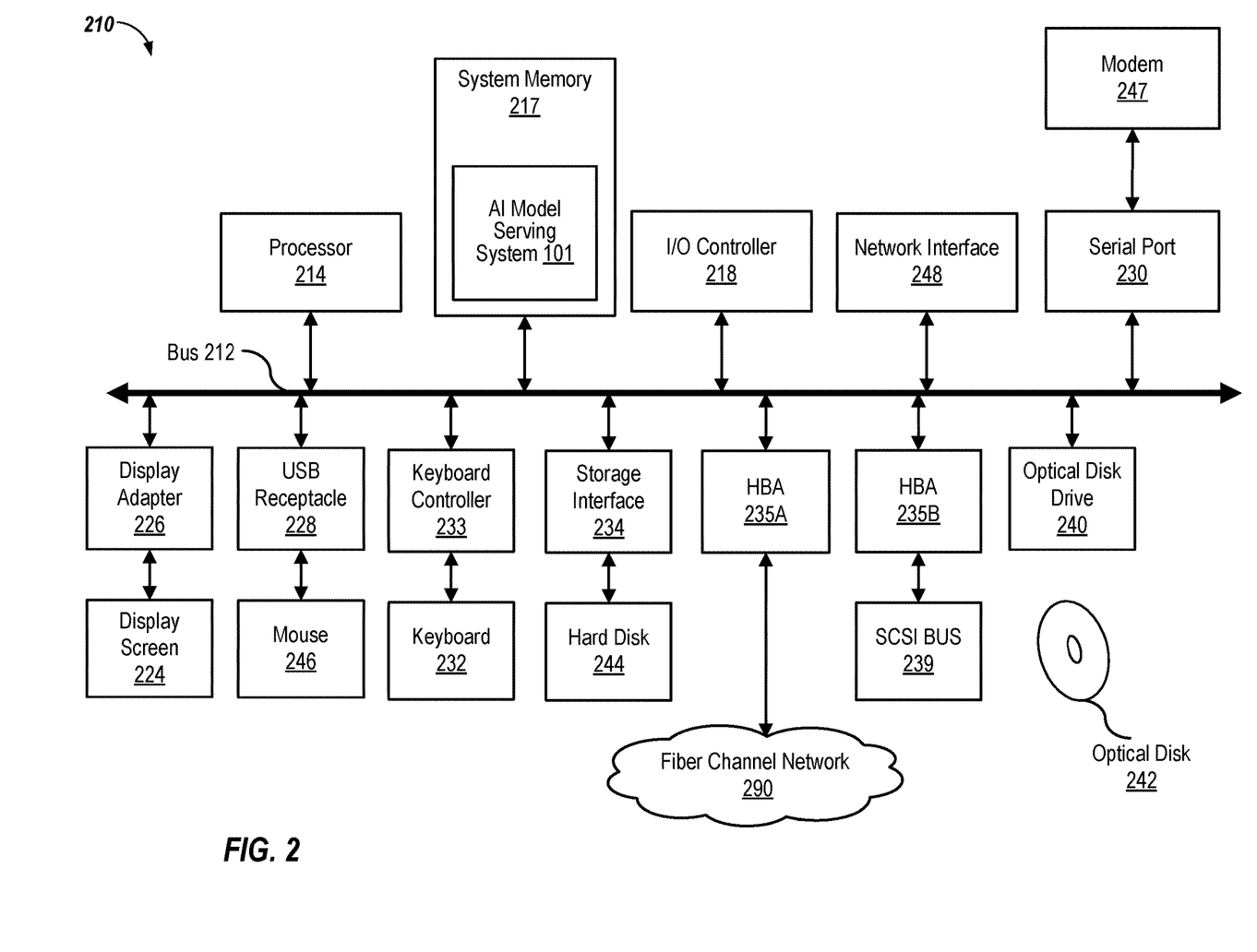
FIG. 2 is a block diagram of a computer system suitable for implementing an AI model serving system.

FIG. 2 is a block diagram of a computer system 210 suitable for implementing an AI model serving system 101. Clients 103 and servers 105 can all be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio input interface 242 communicatively coupled to an audio input device such as a microphone 247, an audio output interface 222 communicatively coupled to an audio output device such as a speaker 220, a display adapter 226 communicatively coupled to a video output device such as a display screen 224, one or more interfaces such as Universal Serial Bus (USB) ports 228, High-Definition Multimedia Interface (HDMI) ports 230, serial ports (not illustrated), etc., a keyboard controller 233 communicatively coupled to a keyboard 232, a storage interface 234 communicatively coupled to one or more hard disk(s) 244 (or other form(s) of storage media), a host bus adapter (HBA) interface card 235A configured to connect with a Fibre Channel (FC) network 290, an HBA interface card 235B configured to connect to a SCSI bus 239, a mouse 246 (or other pointing device) coupled to the bus 212, e.g., via a USB port 228, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have external keyboards 242 or external pointing devices 246, although various external components can be coupled to mobile computing devices via, e.g., USB ports 228). In different implementations the various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 244, solid state drive, flash memory) and loaded into system memory 217 and executed by the processor 214. Application programs can also be loaded into system memory 217 from a remote location (i.e., a remotely located computer system 210), for example via the network interface 248. In FIG. 2, the AI model serving system 101 is illustrated as residing in system memory 217. The workings of the AI model serving system 101 are explained in greater detail below in conjunction with FIG. 3.

The storage interface 234 is coupled to one or more hard disks 244 (and/or other standard storage media). The hard disk(s) 244 may be a part of computer system 210, or may be physically separate and accessed through other interface systems.

The network interface 248 can be directly or indirectly communicatively coupled to a network 107 such as the internet. Such coupling can be wired or wireless.

Figure 3:
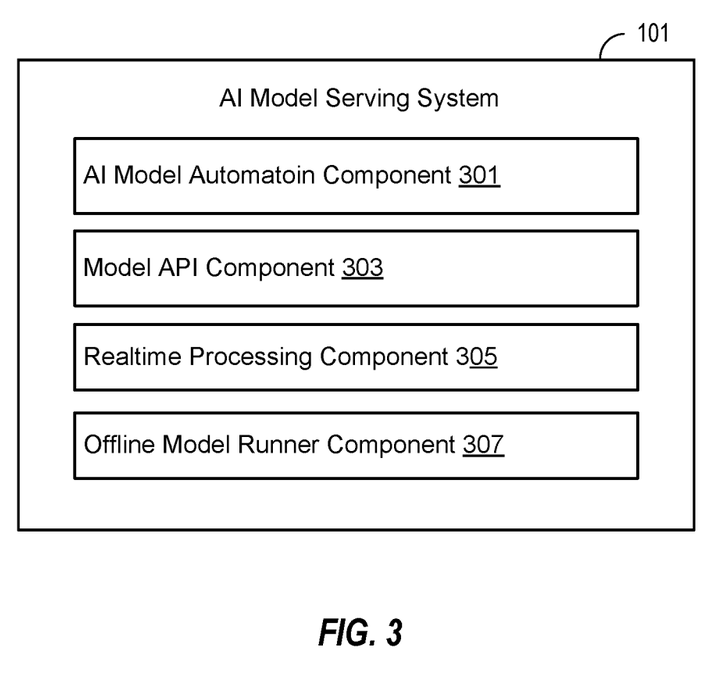
FIG. 3 is a high level block diagram of an exemplary operation of an AI model serving system, according to one implementation.

FIG. 3 illustrates an AI model serving system 101 according to some implementations. As described above, the functionalities of the AI model serving system 101 can reside on specific computers 210 (e.g., servers 105, clients 103) or be otherwise distributed between multiple computer systems 210, including within a fabric/cloud-based computing environment in which the functionality of the AI model serving system 101 is provided as a service over a network 107. It is to be understood that although the AI model serving system 101 is illustrated in FIG. 3 as a single entity, the illustrated AI model serving system 101 represents a collection of functionalities, which can be instantiated as a single or multiple components as desired, with various example components and sub-components illustrated and described in more detail in conjunction with FIGS. 4-10.

In the example implementation illustrated in FIG. 3, the AI model serving system 101 comprises the following components: an AI model automation component 301, a model application programming interface (API) component 303, a realtime processing component 305, and an offline model runner component 307. It is to be understood that the components of the AI model serving system 101 can be instantiated (for example as object code or executable images) within the system memory 217 (e.g., RAM, ROM, flash memory, GPU memory, etc.) of a computer system 210, such that when the processor(s) 214 (e.g., one or more CPUs and/or GPUs) of the computer system 210 processes a component, the computer system 210 executes the associated functionality. In different implementations, the functionality of some or all of the components of the AI model serving system 101 can utilize CPU(s), GPU(s), or any combination thereof, as well as system memory 217, GPU memory, or any combination thereof as desired.

As used herein, the terms "computer system," "computer," "client," "client computer," "server," "server computer" and "computing device" mean one or more computers configured and/or programmed to execute the described functionality. Additionally, program code to implement the functionalities of the AI model serving system 101 can be stored on computer-readable storage media. Any form of tangible computer readable storage medium can be used in this context, such as magnetic, optical or solid state storage media. As used herein, the term "computer readable storage medium" does not mean an electrical signal separate from an underlying physical medium.

Figure 4:
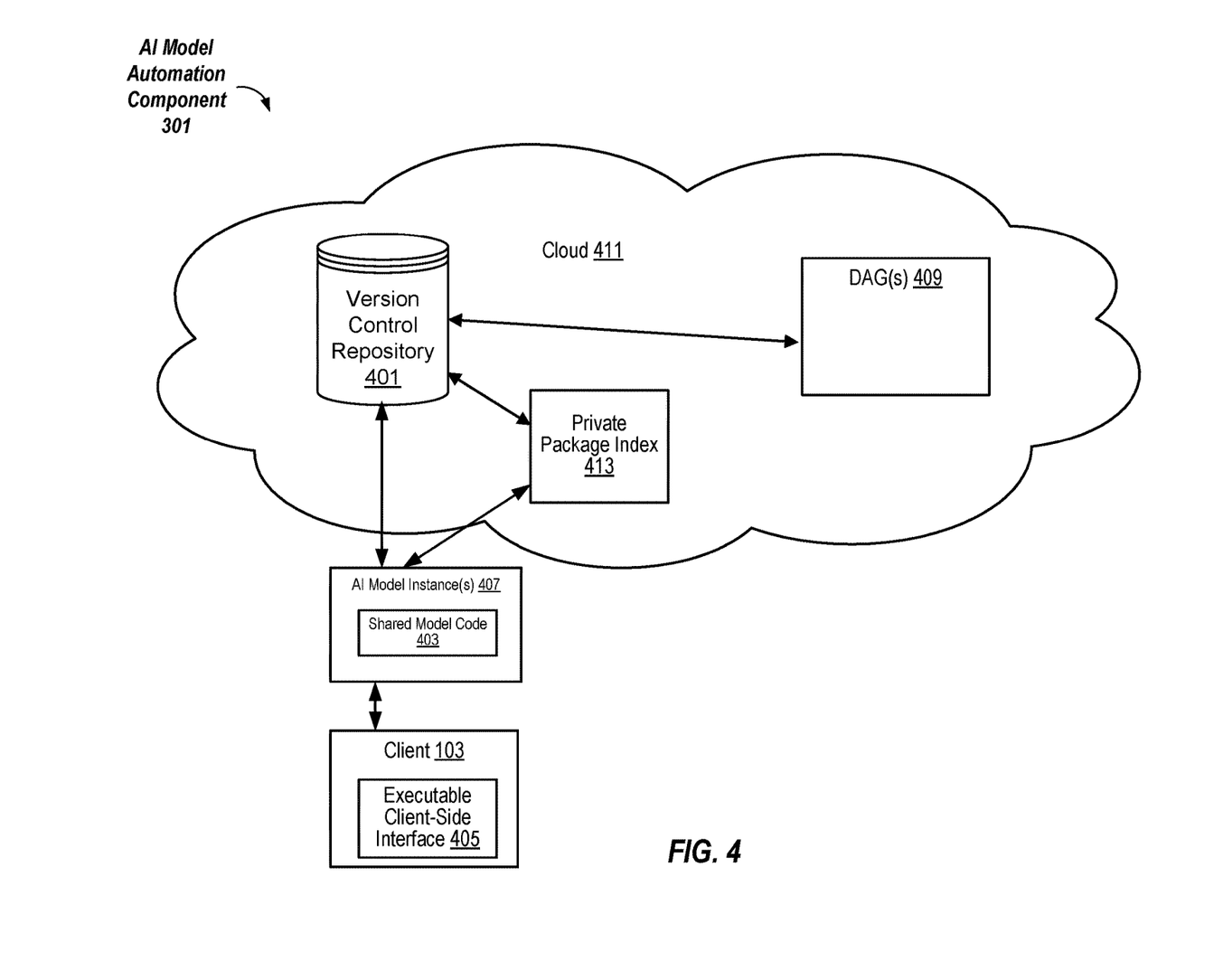
FIG. 4 is a block diagram illustrating an AI model automation component according to one implementation.
Figure 5:
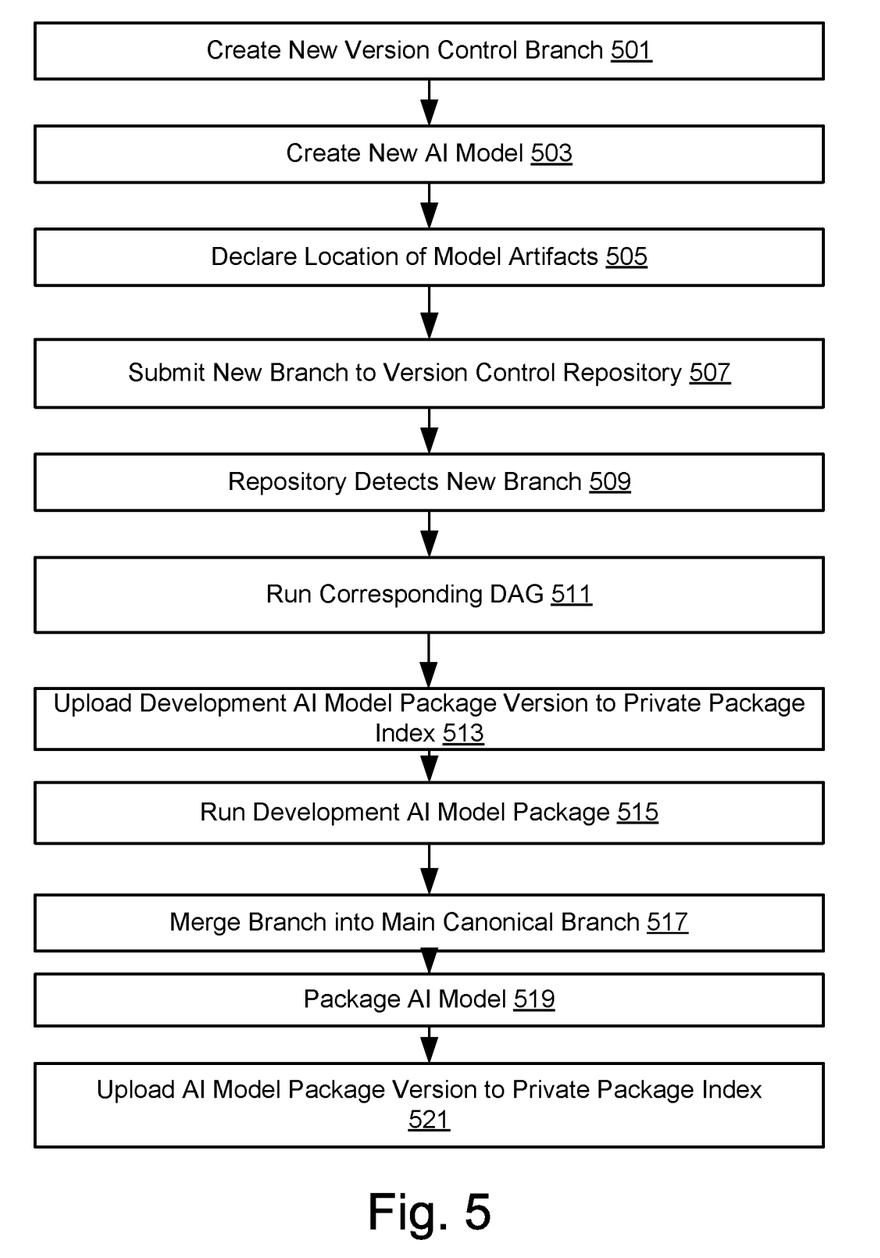
FIG. 5 is a flowchart illustrating example steps for the operation of an AI model automation component, according to one implementation.

One component of the AI model serving system illustrated in FIG. 3 is the AI model automation component 301. FIG. 4 illustrates the AI model automation component 301 in more detail according to one implementation, and FIG. 5 illustrates example steps of the operation of the AI model automation component 301, according to one implementation. As described in detail below in conjunction with FIGS. 4 and 5, the AI model automation component 301 may provide functionality for the automated creation, testing, training, adaptation and deployment of AI model instances 407 with a unified model interface.

In the implementation illustrated in FIG. 4, the AI model automation component 301 comprises a version control repository 401 hosted on a platform that supports webhooks, shared model code 403, an executable client-side interface 405, concrete AI model instances 407 comprising model code and trained model artifacts, automatically triggerable declarative directed acyclic graphs (DAGs) 409 which run in parallel in the cloud 411, and a private model package index 413.

The version control repository 401 provides version control functionality for AI model instances 407, and can be accessed by multiple by remote client-side users. The supported webhooks may be used to trigger DAGs 409 on changes submitted to the version control repository 401.

The shared model code 403 comprises inheritable base classes that provide a unified model interface for all concrete model instances 407, and definitions for model input and output which are consistent across all models. The shared model code 403 may be exposed to all development environments and the like, and may be utilized in the creation of new AI models.

The executable client-side interface 405 provides the ability to generate scaffolding code for a model instance 407 automatically, and to mark the model instance 407 as being a new version which triggers the automatic packaging and upload of the model instance 407 to the private model package index 413, as described in more detail below in conjunction with FIG. 5.

As noted above, the concrete model instances 407 comprise model code and trained model artifacts. The model code and the trained model artifacts, when packaged and loaded into a runtime, provide a consistent, unified model interface which can be used across different machine learning contexts, for example for natural language processing inference or classification on text input. Input to the models conforms to the input schema defined in the shared model code 403, and output of the models conforms to the output schema defined in the shared model code 403.

The automatically triggerable DAGs 409 may run in parallel in the cloud 411. On submission of any changes to model code or trained model artifacts to the version control repository 401, a DAG 409 may be automatically triggered to run functionality such as (1) model code formatting and correctness checks, (2) unit and integration tests, (3) model runtime performance analysis, (4) runtime performance analysis which flags models that run slower than realtime (e.g., slower than 1 second for 1 second of input), (5) packaging of the model code and trained model artifacts as a concrete version into a format that can be loaded into a program runtime, and/or (6) upload/provision of said versioned model package to a private package index 413 which is accessible by, for example, an internal team and/or internal model serving infrastructure or the like.

The private model package index 413 comprises a platform which may store model packages, accept new model package versions and allow remote program package managers or the like to download model packages by, e.g., version number, and load them into their program runtime(s).

Turning now to FIG. 5, steps that may be performed by the AI model automation component 301 are illustrated, according to one implementation. A new version control branch is created 501, based on the main canonical branch of the version control repository 401. The executable client-side interface 405 is used to create 503 a new AI model with a unique name, and generate the corresponding code. Within the new model's configuration files, the location in cloud storage of the trained model artifacts is declared 505. The version control branch is submitted 507 to the version control repository 401, where it may be reviewed, for example by relevant team members. The version control repository 401 detects 509 the new branch, and triggers/runs 511 a corresponding DAG 409 in the cloud to check code correctness and formatting, etc., as described above. A development model package (i.e. not an official model package version) may be uploaded/provided 513 to the private package index 413 as a part of the execution of the DAG 409 in the cloud. The creator of the model (or others, e.g., relevant team members) may optionally install and run 515 this development model package to verify correctness, experiment, prototype, etc. On approval from, e.g., the creator and/or team members as desired, the version control branch may be merged 517 into the main canonical branch of the version control repository 401. The model may be packaged 519 as part of the execution of the DAG 409 in the cloud, and an official model package version may be uploaded/provided 521 to the private package index 413 for consumption by production servers (which may produce results that are visible to customers or other end users as desired). When changes are made to the model, the creator of the model (or others) may use the executable client-side interface 405 to mark the model with a new version that accurately reflects the scope of the change with semantic versioning, which triggers the DAG 409 to execute in the cloud and upload/provide a new official model package version for consumption, as described above.

To clarify the functionality of the AI model automation component 301 of the AI model serving system 101, an example use case is now provided. Suppose customers are calling into a telephone support center for help with products that they purchased. Dozens of these calls may be in progress in the call center at any given moment. A call center manager wants to know whether the call center's support agents are performing successfully, and when this is not the case, whether the manager should proactively step in, for example to prevent the loss of a customer. In this scenario, the manager can use a live (realtime) indicator for whether a given call needs intervention. To implement "manager intervention required" classification using text input from calls, a data scientist curates a relevant training dataset using examples of text from calls in situations that require manager intervention as well as anti-examples of positive situations, trains the desired model on the training dataset, produces trained model artifacts, and runs through the process described above in conjunction with FIG. 5 to create a versioned model package that is ready for serving in a production machine learning (ML) environment. The engineering team then inserts that model package into a running "Realtime Natural Language Processing" ML learning environment that analyzes the content of calls in the call center, and the newly deployed model package begins producing classifications on the text of all transcribed call data in realtime. A call center user interface receives these classifications and displays them to the manager, who may decide whether to intervene on specific calls in the call center that are not going well.

The use of the AI model automation component 301 of the AI model serving system 101 provides various benefits. For example, the AI model automation component 301 can abstract away the runtime from data scientists, and create a generic runtime for deploying machine learning (ML) models for all environments in a way that is versioned in the cloud, which provides an efficient automated way to share and prototype runnable model packages. Further, the AI model automation component 301 enables build-once/reusability/generic models with model inheritance from the base model class, model version tracking, model packaging, automatic realtime performance profiling, and general package scaffolding (i.e., code generation), which means the data scientist builds only the ML model component (the trained model artifacts), and the AI model automation component 301 automatically builds the multi-stage deployment functionality and rollout around that.

Figure 6:
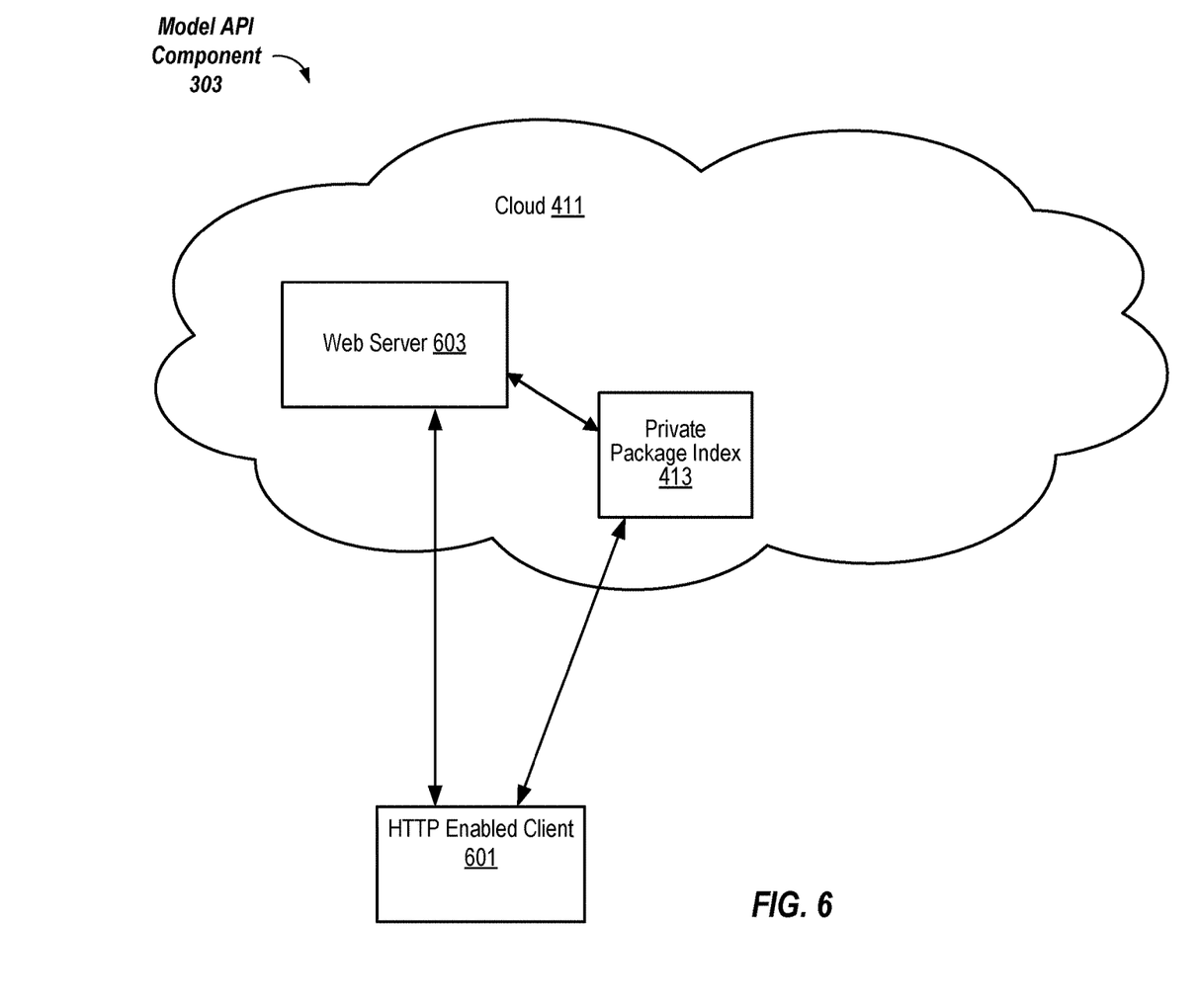
FIG. 6 is a block diagram illustrating a model API component according to one implementation.
Figure 7:
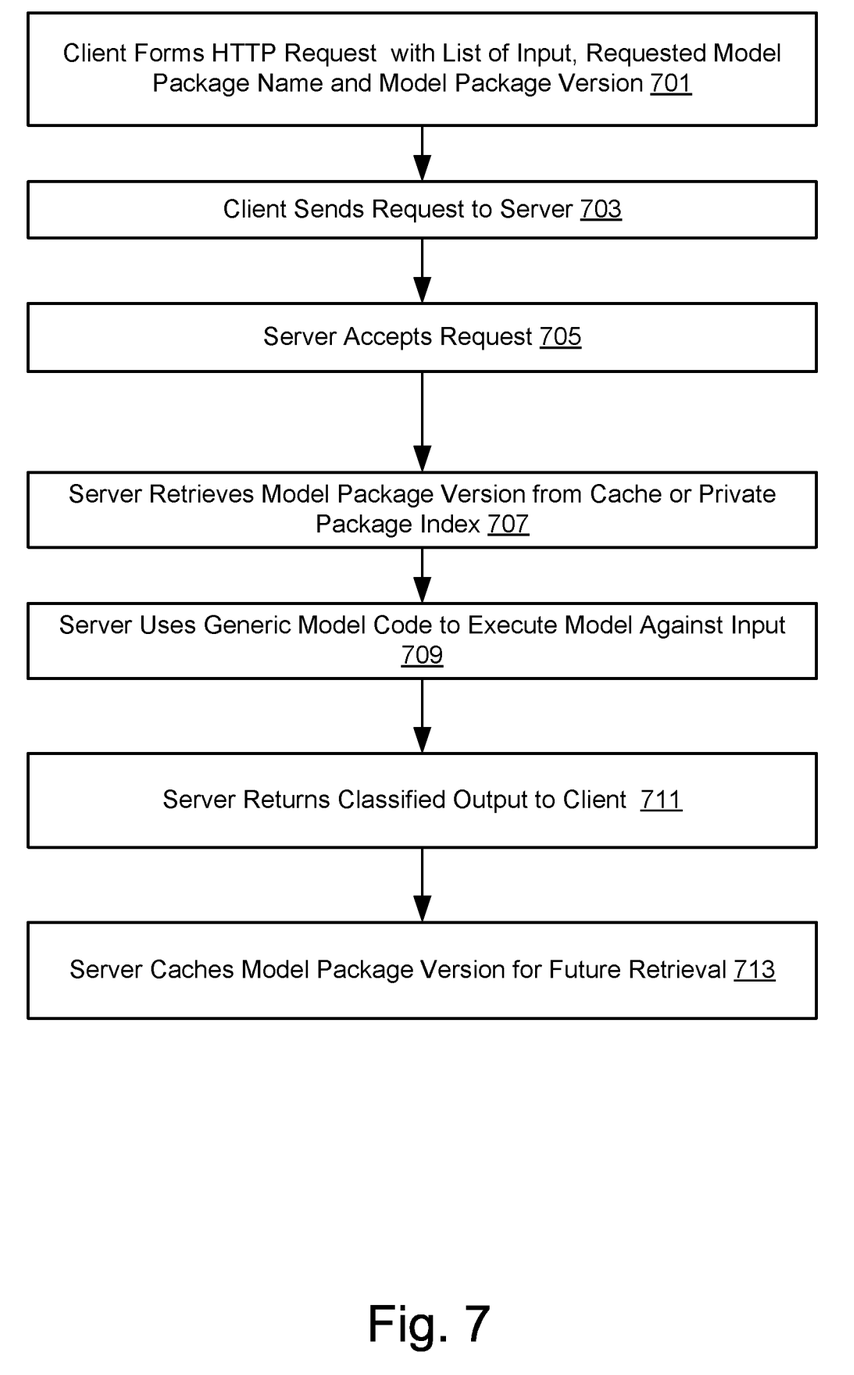
FIG. 7 is a flowchart illustrating example steps for the operation of a model API component, according to one implementation.

Another component of the AI model serving system illustrated in FIG. 3 is the model API component 303. FIG. 6 illustrates the model API component 303 in more detail according to one implementation, and FIG. 7 illustrates example steps of the operation of the model API component 303, according to one implementation. As described below in conjunction with FIGS. 6 and 7, the model API component 303 may provide functionality for just in time (JIT) model creation and caching, enabling the testing of the operation of AI model instances 407.

In the implementation illustrated in FIG. 6, the model API component 303 comprises an HTTP-enabled client 601, a private model package index 413 and a web server 603 with generic model running code. The HTTP-enabled client 601 can run HTTP requests, and may be used for requesting classification of input data (e.g., input texts) using a model package version. In one implementation, the HTTP-enabled client 601 runs in a browser session. As described in conjunction with FIG. 4, the private model package index 413 comprises a platform which may store model packages, accept uploads of new model package versions and allow remote program package managers or the like to download model packages by, e.g., version number, and load them into their program runtime(s).

The web server 603 with generic model running code accepts HTTP requests from the HTTP-enabled client 601 to classify input data (e.g., texts) using a model package version. If the model package version has been requested recently, the web server 603 may retrieve it from a cache. Otherwise, the web server 603 downloads the package from the private package index 413, and uses the generic model running code to execute the model against the input. The web server 603 then returns the classified output to the client via HTTP response.

FIG. 7 illustrates steps that the model API component 303 may perform, according to one implementation. The Hypertext Transfer Protocol (HTTP) enabled client 601 forms 701 an HTTP request with a list of input texts to process, a requested model package name and a model package version. The HTTP-enabled client 601 then sends 703 the request to the web server 603 (e.g., using a given URL). The web server 603 accepts 705 the request, and retrieves 707 the model package version (either from a server-side cache from a recent request if available, or else a downloaded package from the private package index 413), and uses the generic model running code to execute 709 the model against the input data. The server 603 then returns 711 the classified output to the client 601 via HTTP response. The server 603 may cache 713 the model package version for future use.

An example use case is now provided to clarify the functionality of the model API component 303. Continuing with the context used in the example use case described for the AI model automation component 301 above, suppose a data scientist has discovered that perhaps what the call center manager wants is not a "manager intervention required" model, but instead a "what is the sentiment of the customer" (e.g., a general "sentiment") model, which measures whether any utterance (e.g., a spoken sentence) is positive, neutral, or negative in intent. With this in mind, the data scientist creates the new model with the new design, and uses the AI model automation component 301 as described in conjunction with FIGS. 4 and 5 to create a model package for the "sentiment" model which is now available on the private package index.

Because this is a new model type, the data scientist wants to share the prototype with, for example, fellow data scientists, product managers, and executives in the organization. Conventionally, this would be problematic because some or all of these of these individuals would not have a properly configured runtime environment to test the model package, and are not technologically trained to do so. However, using the model API component 303 as described above, these users can send an HTTP request to the server 603 with the following details: the desired model package name, the desired model package version and a list of input text to feed into the desired classifier.

The model API component 303 does not need to be configured to run this new model or this new version, but instead downloads and runs the model package version dynamically and JIT. The request returns the classified output as processed by the model package version, which in this case comprises the classified text with indications of whether each text input in the list is "positive, "negative," or "neutral." This enables the data scientist to share model prototypes with non-technical individuals without having to configure a runtime or having to declare new model package versions as being available for use.

Once the prototype has been interactively used by others with their desired input text, it may be deployed to the production realtime natural language processing (NLP) environment, to run realtime classification on active telephone calls, and to provide the call center manager with live "sentiment" readings.

The use of the model API component 303 may provide a number of benefits. The model API component 303 is a practicable way for data scientists to test their insights from any data, and explore those insights. JIT model creation and caching enables the model API component 303 to provide a dynamic way to prototype insights, and explore how a given model performs. This enables a data scientist to determine whether s/he is on the right track. No configuration is required for the data scientist, who also does not require any onsite server. The model API component 303 may power integrations with different prototyping libraries and services to practicably explore new insights. It may serve models to any environment, such as cloud-hosted Python notebooks, for example.

The model API component 303 also allows the prototyping of models before releasing them, and automatically deploying new and in-development models to the API. Different versions of the same model may be used behind the interface. Further, labeled test sets may be batch run against a set of different model versions via the API, rather than having to individually configure a runtime environment. All of this functionality can be automatic, e.g., the model API component 303 may periodically grab the latest labeled data, blast it against the API, and gather the results.

Figure 8:
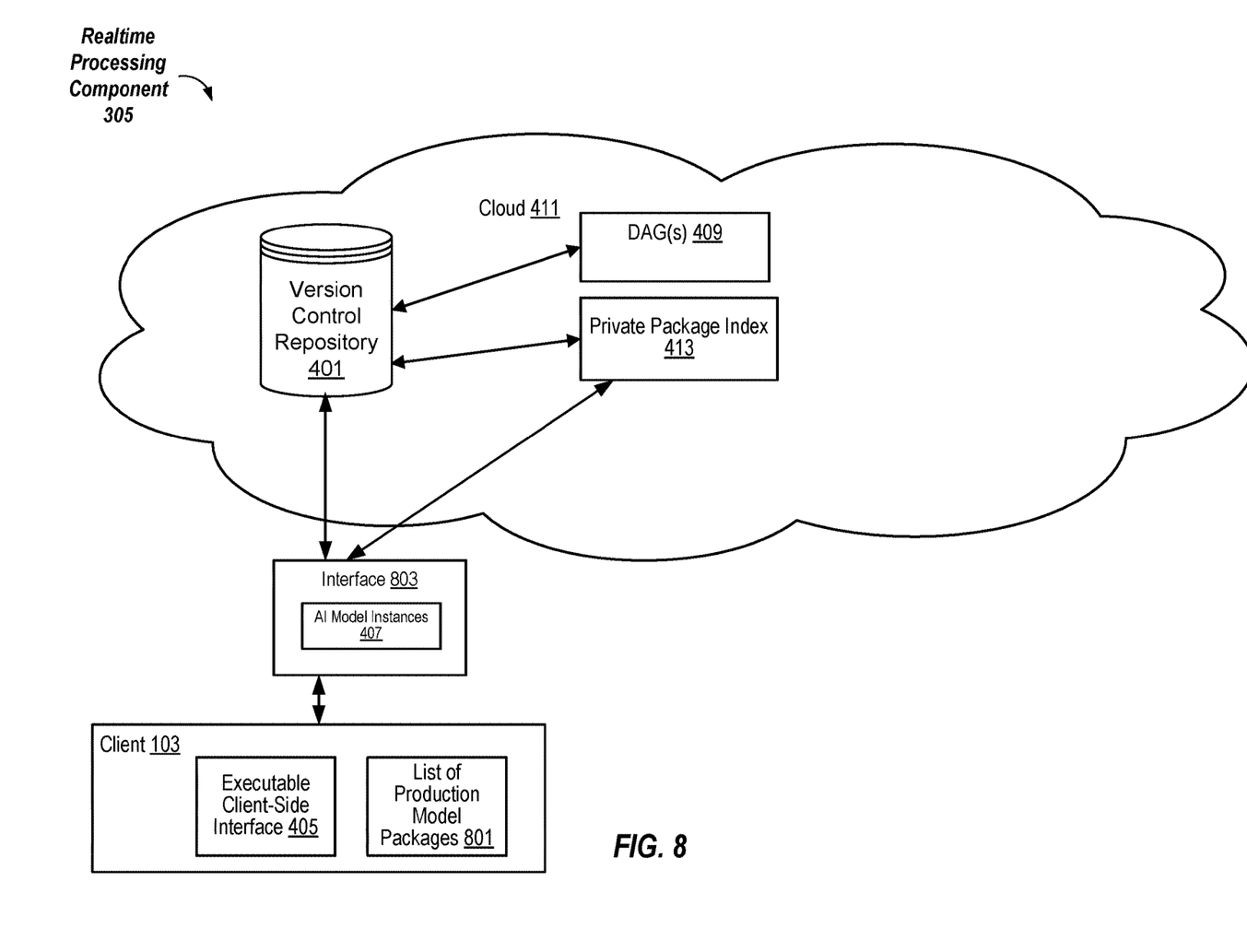
FIG. 8 is a block diagram illustrating a realtime processing component according to one implementation.

The next component of the AI model serving system illustrated in FIG. 3 is the realtime processing component 305. FIG. 8 illustrates the realtime processing component 305 in more detail according to one implementation. As described in detail below in conjunction with FIG. 8, the realtime processing component 305 may expose insights generated from AI model instances 407 to users in realtime.

In the implementation illustrated in FIG. 8, the realtime processing component 305 comprises the version control repository 401 hosted on a platform that supports webhooks, the private model package index 413, a list 801 of model package versions which are loaded and run in production, generic model-running code that runs models using the executable client-side interface 405 described in conjunction with the AI model automation component 301, automatically triggerable DAGs 409 which may run in parallel in the cloud 411, and an interface 803 that routes messages directly to a customer's user interface (UI).

The version control repository 401 and the private model package index are described above in conjunction with FIGS. 4 and 5. The use of those components in the context of the realtime processing component 305 is described in more detail below, and in conjunction with the corresponding example use case.

In the context of the realtime processing component 305, the automatically triggerable DAGs 409 may run in parallel in the cloud 411. On submission of any changes to model code or trained model artifacts to the version control repository 401, a DAG 409 may run model code formatting and correctness checks, perform unit and integration tests, download the model package, perform runtime environment compilation, and perform deployment of compute instance pools onto cloud infrastructure.

The interface 803 that routes messages directly to the customer's UI may route classified text output, so that the customer (or other relevant party) is notified of relevant NLP insights as soon as available.

An example use case is now provided to describe the functionality of the realtime processing component 305 in more detail. Given the context of the example use case described above in conjunction with the other components, suppose a data scientist has completed designing, training, and packaging the "manager intervention required" model, and wishes to expose it to the call center manager for production use. The data scientist may communicate with the relevant engineers about this new model, and after testing and approval, the engineers include the model package version as a dependency in the realtime NLP program, and add it to the list 801 of models that are run on live input of transcript text. Once the executable DAG 409 completes, the compute instance pool has been fully deployed and is now classifying text and sending the classified output to the call center manager. This model runs in parallel along with all of the pre-existing models that were running on live transcription text previously.

Since all model packages as produced by the AI model automation component 301 have a consistent interface, the realtime processing component 305 does not have to be modified in any special way to run new models. The new models are just loaded into the list 801 or set, and run in sequence, or in parallel, using the model interface 803.

The realtime processing component 305 can thus provide benefits such as a layer that can expose generated insights to users in realtime, with arbitrary parallelism allowing any number of models to be run in parallel.

Figure 9:
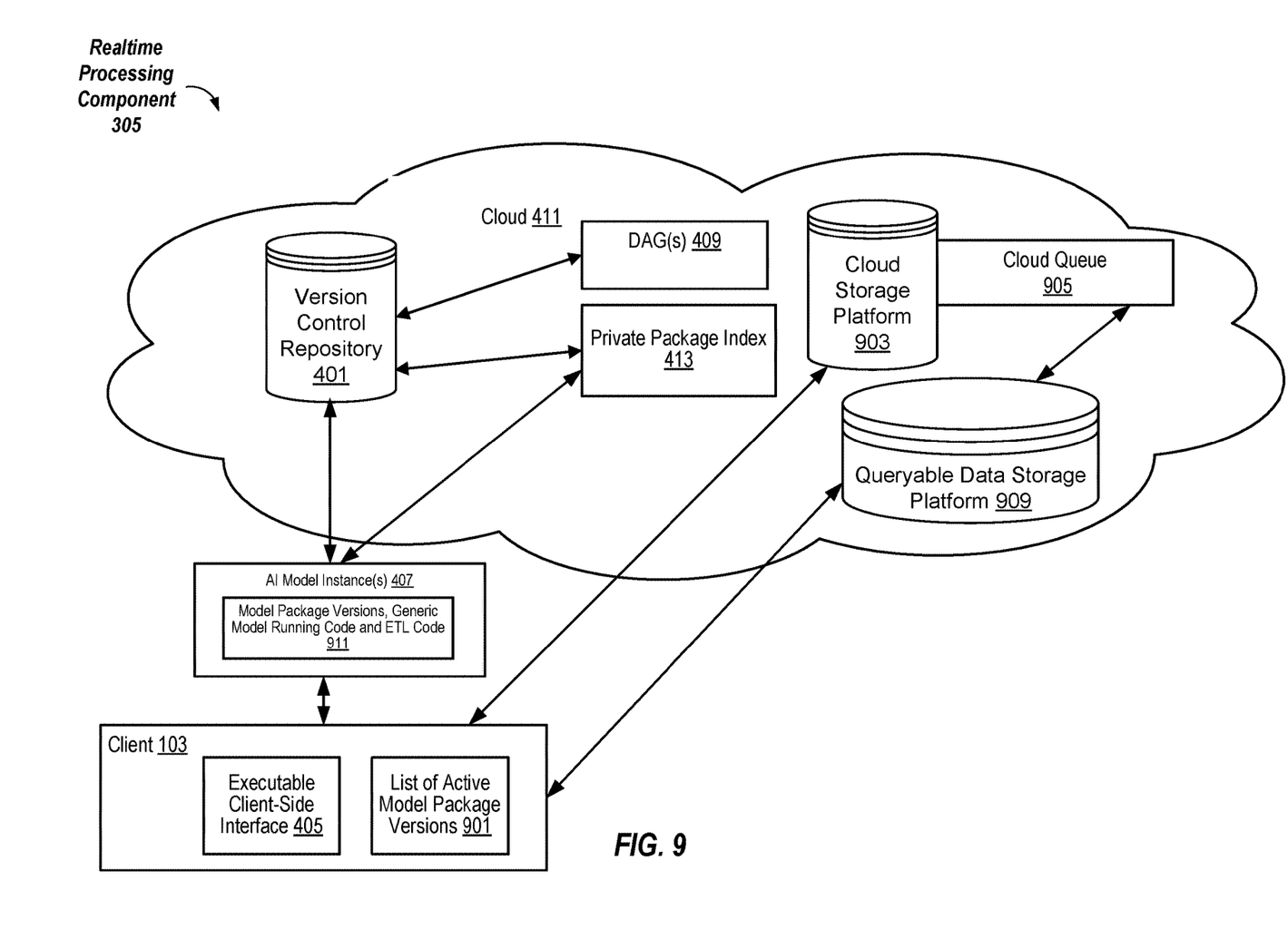
FIG. 9 is a block diagram illustrating an offline model runner component according to one implementation.
Figure 10:
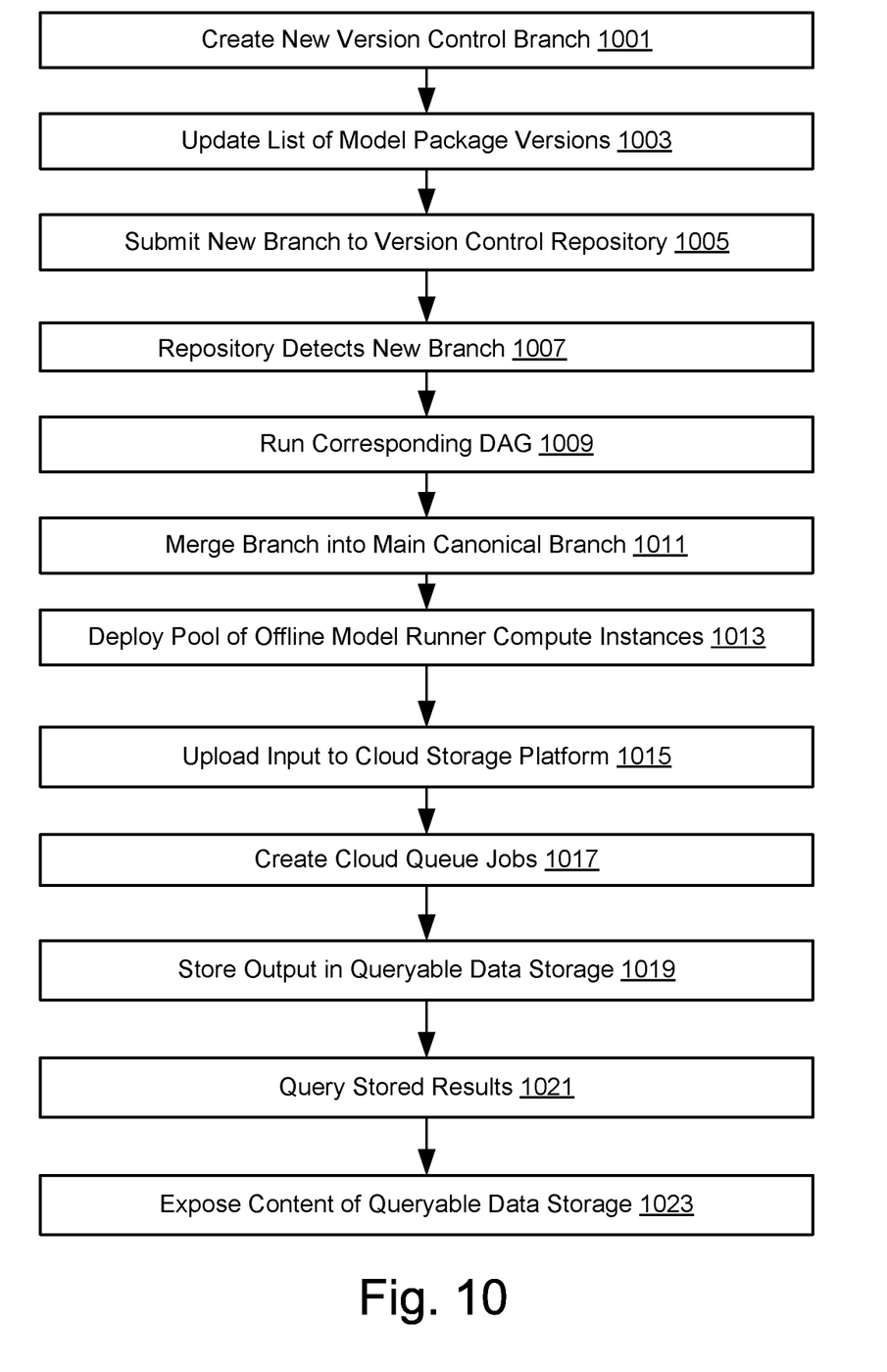
FIG. 10 is a flowchart illustrating example steps for the operation of an offline model runner component, according to one implementation.

The final component of the AI model serving system illustrated in FIG. 3 is the offline model runner component 307. FIG. 9 illustrates the offline model runner component 307 in more detail according to one implementation, and FIG. 10 illustrates example steps of the operation of the offline model runner component 307, according to one implementation. As described in detail below in conjunction with FIGS. 9 and 10, the offline model runner component 307 facilitates running AI model instances 407 offline, which may be used, for example, to explore the operation of many model versions on large scale off-production data.

In the implementation illustrated in FIG. 9, the offline model runner component 307 comprises the version control repository 401 hosted on a platform that supports webhooks, the private model package index 413, a list 901 of active model package versions, watch notifications on a cloud storage platform 903 and a cloud queue 905, automatically triggerable DAGs 409 which run in parallel in the cloud 411, a generic deployment declaration template for cloud compute instance pools, generic model running code and extract-transform-load (ETL) code 911 and a queryable data storage platform 909.

The version control repository 401 and the private model package index 413 are described above in conjunction with FIGS. 4 and 5. The use of those components in the context of the offline model runner component 307 is described in more detail below in conjunction with FIG. 10 and the example use case.

In the context of the offline model runner component 307, the automatically triggerable DAGs 409 may run in parallel in the cloud 411. On submission of any changes to offline model runner runtime code or the list 901 of running model package versions, a corresponding DAG 409 may run model code formatting and correctness checks, unit and integration tests, generation of runtime containers (executable environments) for each model package version which combines the generic model running and ETL code 911 with the model package version (as downloaded from the private package index), generation of deployment declarations that represent the compute instance pools per model package version in the list 901, and submission of deployment declarations to cloud infrastructure which creates the compute instance pools per model package version in the list 901.

The list 901 of active model package versions can be in the form of a file containing a declared list wherein each entry describes a model package version, the required compute resources to run it, and the mode of input, such as, in the example context of NLP, realtime input according to which input text is split into utterances which correspond to how the text is spoken, and offline input in which an entire call transcript for one call participant is fed as the input text. The list 901 may define which model package versions should be continuously run in compute instance pools. The list 901 may contain more than one version of the same model package which may be run in parallel.

Describing the watch notifications in more detail, input data may be uploaded to the cloud storage platform 903 from an upstream service, for example as a participant's entire call transcript. The watch notifications listen for new additions to this cloud storage platform 903, and in response to detecting the upload of new additions, create "jobs" (e.g., NLP jobs) on a cloud queue 905, which act as the text input to the offline component runner component 307 compute instance pools.

The generic deployment declaration template for cloud compute instance pools are combined with a model package version, resource requirements, and runtime model to produce a deployment declaration file that represents a compute instance pool for a model package version. The generic model running code and ETL code 911 may be built into the runtime containers for each model package version that handles text input download (extract), execution of the model package version to produce an output (transform), and submission to the queryable data storage platform 913 for persistence (load). The queryable data storage platform 913 is a data storage platform which is queryable, e.g., by SQL, which may serve as a storage location for the model outputs.

FIG. 10 illustrates steps performed during the operation of the offline model runner component 307, according to one implementation. A version control branch is created 1001 based on the main canonical branch of the version control repository 401. The list 901 of active model package versions is updated 1003 to either remove, modify, or add a model package version that was created through the operation of the AI model automation component 301 and is available in the private package index. The version control branch is submitted 1005 to the version control repository 401 for review by, e.g., relevant team members. The version control repository 401 detects 1007 the new branch, and runs 1009 a corresponding DAG 409 in the cloud to check code correctness and formatting, etc., as described above in conjunction with FIG. 9. On approval from e.g., relevant team members, the version control branch is merged 1011 into the main canonical branch of the version control repository 401. A pool of offline model runner compute instances is deployed 1013 with the updated or added model package version as part of the DAG 409 execution in the cloud, and begins running its classification (e.g., NLP classification) on the live input text, e.g., from call transcriptions when new input is available. For example, when a call ends the input (e.g., the transcripts for all participant sides) is uploaded 1015 to the cloud storage platform 903, e.g., as separate text files. Watch notifications create 1017 cloud queue "jobs" which act as the input text to the offline model runner compute instance pools. For each input text item, classified text is output from each offline model runner compute instance pool (corresponding to a model package version), such that all model package versions run all input text items. Each classified text output is stored 1019 in a queryable data storage platform 909. Data scientists, engineers and other parties may query (e.g., with SQL) 1021 the results stored in the queryable data storage platform 909, e.g., for use in analysis or to drive further model optimization and exploration. An analytics platform may periodically pulls content from the queryable data storage platform 909 into a format that is efficient to query against for aggregations, and expose 1023 that data to customers and the like, e.g., through a UI.

To further clarify the functionality of the offline model runner component 307, an example use case is now provided. Continuing with the use case scenario from above, suppose a data scientist has discovered either a new model design or superior training data, and thinks that this could produce a more accurate "manager intervention required" model. Suppose the data scientist has designed and trained the new version of the model, and followed the process described above to package and upload/provide the new version to the private package index. Now, the data scientist would like to compare the currently running version of the model against this newly created version, using live input text from active calls to determine the real-world performance difference.

To do this, the data scientist may update the list 901 of model versions actively being run by the offline model runner to include this latest version of the "manager intervention required" model package, which triggers the DAG 409 that automatically deploys a new pool of compute instances which run the new model package version on live data. The data scientist waits while the offline model runner instance processes data for the two relevant model package versions and stores the outputs in the queryable data storage platform 909. After enough data has been processed and there are enough classifications of text inputs that the models claim to fit the "manager intervention required" pattern, the data scientist uses the queryable data storage platform 909 to take a random sampling of inputs and corresponding outputs for the model versions in question. The data scientist may then send the inputs from the random sampling to be labelled by human analysts, as either being an instance of "manager intervention required" or not. The data scientist can then use the resulting labelled input as the truth to which the output classifications of both model package versions are compared.

Using the model package code itself (as described above in conjunction with FIGS. 4 and 5) to run a performance evaluation of the accuracy of the model package versions with the labelled input as references, the data scientist can compare the accuracy results. If the new version is superior, the data scientist may make the decision to update the currently running "Realtime NLP" model version for "manager intervention required" to the new model package version. In this case, the call center manager would now receive a more accurate signal (i.e. fewer false positives, fewer false negatives, and more true positives) for whether a support agent needs manager intervention on their customer support calls.

The offline model runner component 307 thus provides various benefits. For example, it may enable exploration of insights in larger scale off-production data automatically, help pre-label data as part of an active learning pipeline, replay production data and save artifacts of inference, and run multiple model versions in "dark mode." Further, the offline model runner component 307 can power offline search of history of insights over time against separate versions, which may help teams test and build ensemble models, and generate future insights.

As will be understood by those familiar with the art, the subject matter described herein may be embodied in other specific forms without departing from the spirit or essential characteristics thereof. Likewise, the particular naming and division of the protocols, portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific implementations. However, the illustrative discussions above are not intended to be exhaustive or limiting to the precise forms disclosed. Many modifications and variations are possible in view of the above teachings. The implementations were chosen and described in order to best explain relevant principles and their practical applications, to thereby enable others skilled in the art to best utilize various implementations with or without various modifications as may be suited to the particular use contemplated.

What is claimed is:

1. A computer implemented method, comprising:
   creating a new development version control branch on a main canonical branch of a version control repository, corresponding to a received new artificial intelligence (AI) model with a unique name, corresponding code, and trained model artifacts;
   automatically running at least one declarative directed acyclic graph (DAG) corresponding to the new AI model;
   automatically performing, by the DAG, a plurality of tests and analysis concerning the new AI model from a group consisting of: a code formatting check, a code correctness check, unit and integration tests, and AI model runtime performance analysis;
   packaging, by the at least one DAG, code and trained model artifacts of the new AI model into a versioned development model package that is loadable into a program runtime;
   providing, by the at least one DAG, the versioned development model package to a private package index, wherein the versioned development model package is exposed to development environments;
   responsive to an approval of the versioned development model package, merging the new development version control branch into the main canonical branch of the version control repository;
   packaging, by the at least one DAG, the code and the trained model artifacts of the new AI model into a versioned production model package; and
   providing, by the at least one DAG, the versioned production model package to a private package, wherein the versioned development model package is exposed to production environments, wherein the versioned development model package is accessed by at least one production environment and utilized in a run time production program to make AI classifications of input.

2. The method of claim 1 wherein automatically performing, by the at least one DAG, a plurality of tests and analysis concerning the new AI model further comprises:
   performing runtime performance analysis which flags whether the new AI model runs slower than realtime.

3. The method of claim 1 further comprising:
   multiple DAGs running in parallel and performing separate tests or analysis responsive to receipt of multiple changes to model code or trained model artifacts.

4. The method of claim 1 further comprising:
   exposing shared model code to at least one development environment, the shared model code comprising at least one inheritable base class that provides a unified model interface for multiple AI model instances, and definitions for model input and output which are consistent across the multiple AI model instances.

5. The method of claim 1 further comprising:
receiving the new AI model from an executable client-side interface, the executable client-side interface having automatically marked a specific model instance as being a new version, triggering automatic packaging of code and trained model artifacts, and upload of the new AI model instance.

6. The method of claim 5 wherein:
the executable client-side interface further automatically generates scaffolding code for the new AI model instance.

7. The method of claim 1 further comprising:
generating of deployment declarations that represent compute instance pools corresponding to model package versions in a list; and
creating the corresponding compute instance pools.

* * * * *